United States Patent [19]
Carman, Jr. et al.

[11] 3,815,043
[45] June 4, 1974

[54] LASER SYSTEM EMPLOYING RAMAN ANTI-STOKES SCATTERING

[75] Inventors: Robert L. Carman, Jr., Livermore; Charles K. Rhodes, Pleasanton, both of Calif.

[73] Assignee: The United States of America as represented by the United States Atomic Energy Commission, Washington, D.C.

[22] Filed: Jan. 11, 1973

[21] Appl. No.: 322,642

[52] U.S. Cl. .......................... 331/94.5 G, 330/4.3
[51] Int. Cl. .................................................. H01s 3/22
[58] Field of Search ..................... 331/94.5; 330/4.3

[56] References Cited
OTHER PUBLICATIONS

Glass et al., Pulse Shapes and Spatial Modes in Raman Lasers. J. Quant. Elect., Vol. QE-5, No. 1 (January 1969) pp. 1-6.

*Primary Examiner*—William L. Sikes
*Attorney, Agent, or Firm*—John A. Horan; F. A. Robertson; L. E. Carnahan

[57] ABSTRACT

A laser system which employs a Raman anti-Stokes scattering process to produce high energy pulsed outputs of narrow pulsewidth and short wave-length, particularly useful in controlled fusion applications utilizing coherent optical pulses for plasma heating, and provides means for optically isolating the laser source from the laser system's target (the fusion plasma).

3 Claims, 6 Drawing Figures

LASER SYSTEM EMPLOYING RAMAN ANTI-STOKES SCATTERING

BACKGROUND OF THE INVENTION

The invention described herein was made in the course of, or under, Contract No. W-7405-ENG-48 with the United States Atomic Energy Commission.

Controlled fusion processes, employing optical pulses for plasma heating, require laser systems capable of producing pulsed outputs of large energy, short wavelength (ultraviolet), and narrow pulsewidth. In recent years much research effort has been directed to various types of laser systems for achieving this capability.

SUMMARY OF THE INVENTION

The present invention is directed to a laser system having the above-mentioned capabilities, and is based on the observation that an excited medium which is forbidden to radiate by the emission of a single quantum can generally radiate through an appropriate two-quantum process. One such process, employed by the present laser system, is Raman scattering for which the anti-Stokes process represents an energy gain per quantum.

Therefore, it is an object of this invention to provide a laser system which employs Raman anti-Stokes scattering.

A further object of the invention is to provide a laser system capable of producing pulsed outputs of large energy, short wavelength, and narrow pulsewidth.

Other objects of the invention will become readily apparent from the following description and accompanying drawings.

DESCRIPTION OF THE INVENTION

The present invention employs a cascaded Raman anti-Stokes scattering process and provides a laser system capable of producing high energy pulsed outputs, such as many kilojoules, of narrow pulsewidth, such as ten picoseconds, and short wavelength (ultraviolet), such as 4,000 A or less. The inventive laser system is particularly useful in controlled fusion applications utilizing coherent optical pulses for plasma heating, and provides means for optically isolating the laser source for the laser system's target (the fusion plasma).

Figure 1:
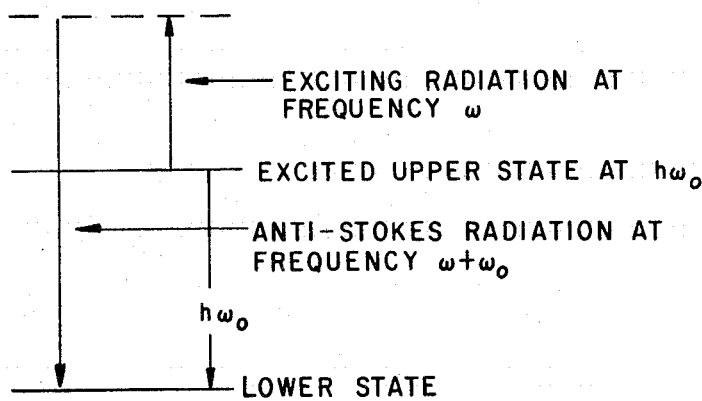
FIG. 1 illustrates the general scattering event of the Raman anti-Stokes scattering process.

An excited medium which is forbidden to radiate by the emission of a single quantum can generally radiate through an appropriate two-quantum process. Such media have the attractive property that they may store large quantities of energy, yet present no optical gain unless illuminated by a sufficiently intense electromagnetic wave. One such process, employed by the present laser system, is Raman scattering for which the anti-Stokes process represents an energy gain per quantum and, thus, radiates to the blue of the exciting line. The general scattering event of this process is shown in FIG. 1.

By employing the Raman scattering process, energy extraction is combined with a wavelength shift toward the ultraviolet. Furthermore, the process combines the desired features for fusion application of narrow pulsewidth (obtainable from a conventional solid state laser), a wavelength in the ultraviolet region, and high energy storage and extraction.

Figure 2:
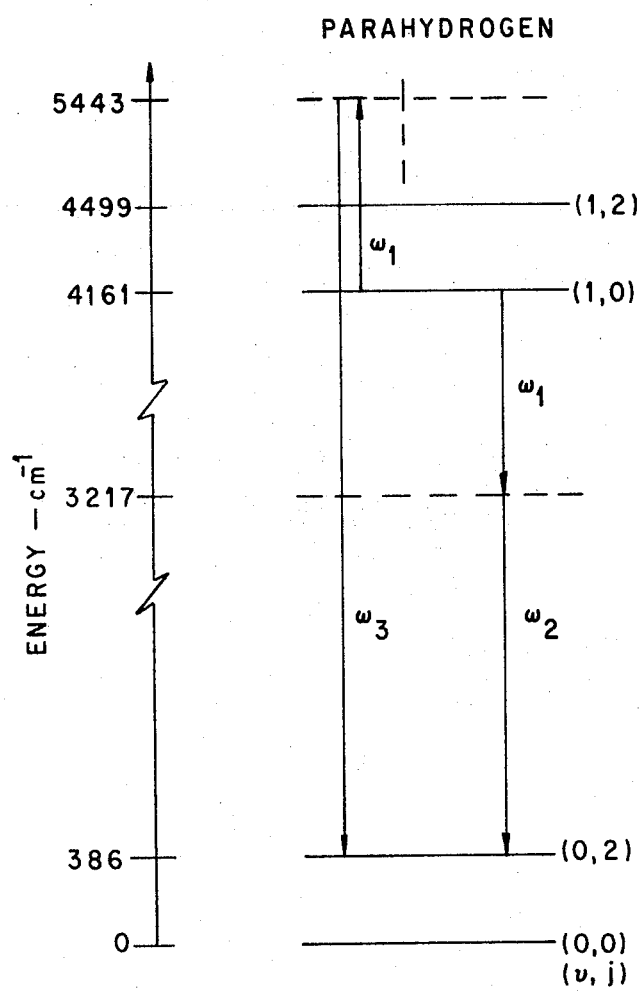
FIG. 2 is a partial energy level diagram of para-$H_2$ illustrating the Raman anti-Stokes and direct two quantum processes.

FIG. 2 illustrates a partial energy level diagram of molecular parahydrogen (para-$H_2$) which illustrates the stimulation of the inverted $O_{01}$ (2) transition in both Raman anti-Stokes ($W_3$) and direct two quantum ($W_1 + W_2$) processes with 10.6 $\mu$ $CO_2$ ($\sim$ 944 $cm^{-1}$) radiation. The energy scale is correct to within about 1 $cm^{-1}$. Notice that for $CO_2$ the situation is quite far from the degenerate case where $\omega_1 = \omega_2$ and $\omega_3 = 3\omega_1$, so that the anti-Stokes Raman process should be favored. If either ruby or Nd: glass lasers are used, the direct two quantum processes no longer exist.

Figure 3:
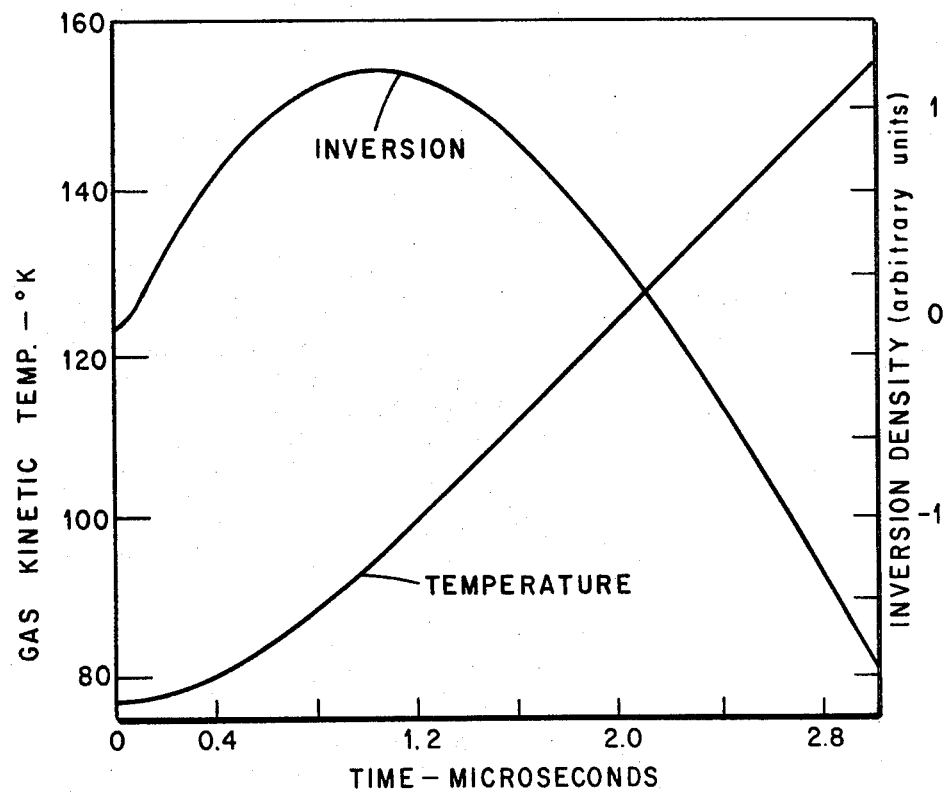
FIG. 3 graphically illustrates the time dependence of inversion density and gas kinetic temperature for para-$H_2$ under specified conditions.

It is well known that if the vibrational temperature differs from the gas kinetic temperature that some pair of vibrational-rotational levels is inverted. Preliminary kinetic calculations indicate that the $O_{01}(2)$ transition (among others) may be inverted in high pressure parahydrogen at 77°K through excitation by electrons in a transverse electron beam machine. An example of these results arising from a rate equation analysis, which follows the individual rotational-vibrational level populations, is shown in FIG. 3 for the stated conditions. As shown in FIG. 3, time dependence of inversion density and gas kinetic temperature for para-$H_2$ initially at 77°K and 5 amagats density is illustrated when excited by a transverse electron beam machine such as described in an article by C. A. Fenstermacher et al in Applied Physics Letters 20, 56 (1972). As shown, the peak or maximum inversion density occurs at nearly one microsecond after initiation of the electron beam pumping and corresponds approximately to 80 joules/liter stored energy density. In this calculation, the drift current density was roughly 50 amps/$cm^2$. In this case an appropriate E/P $\sim$ 6–8 volts/cm-torr (E/P) was adjusted to give a mean electron drift energy of 1 to 2 electron-volts. The gain at the greater times is destroyed by gas heating. It is further pointed out that for the $O_{01}(2)$ transition, this inverted energy density is in a single quantum state of the radiating systems, and consequently no rotational relaxational processes are required to couple the stored energy to the radiation field. Furthermore, inversions in long systems will be limited only by superfluorescence due to electric quadrupole coupling, an extremely weak process.

The Raman gain for ruby lasers and high pressure $H_2$ has been calculated and experimentally verified to be $\gamma = 2 + 10^{-9}$ cm/watt for Stokes scattering in an unpumped gas at above 10 atmospheres pressure. The Raman gain becomes independent of pressure above 10 atmospheres where pressure broadening of the Raman linewidth replaces collisional line narrowing effects. Since only a small fraction of the gas will become inverted in the $O_{01}(2)$ state, high intensities and short pulses become essential in order to stimulate the anti-stokes scattering. For short pulses, the Raman process can become transient.

The transient condition occurs for laser pulse durations $t_p$ which satisfies the condition, $$t_p < 4(\gamma IZ)/\Gamma = 4G_{ss}/\Gamma \qquad (1).$$

where I is the laser intensity, Z the length of the medium, and $\Gamma$ is the inverse of the vibrational dephasing time. At 297°K and a density of 10 amagats, $\Gamma/c = 0.008°$ cm$^{-1}$ for $H_2$. High conversion implies that $G_{ss} \gtrsim 15$. Therefore, $t_p > 250$ nsec and this minimum pulse duration varies inversely with pressure for higher than 10 atmospheres.

While it is possible to achieve good conversion efficiencies in a collimated beam according to theory, only forward Raman scattering has been considered. This assumption is only correct for a pulse duration where Brillouin scattering is too transient to effectively compete and sufficiently short so that the spatial extent of the pulses is small compared with a Raman exponentiation length. These conditions dictate that one must operate in the transient regime.

For transient stimulated Raman scattering, the gain coefficient can be approximated by $$G_t = \sqrt{4\gamma IZt_p\,\Gamma} \qquad (2).$$

Thus, the gain coefficient becomes independent of Raman linewidth, implying a square root variation with gas density. Assuming the equivalent of 10 atmospheres of $H_2$ inverted for the Raman transition, a 1 meter cell length, and $G_t = 15$ then about 1 Joule/cm$^2$ of ruby light is required in a pulse of $\lesssim 0.3$ nsec to obtain significant anti-Stokes conversion. Since many vibrational levels and rotational levels in principle can contribute, this may mean not more than 100 atmospheres of $H_2$ would have to be pumped.

If these results are now applied to the case of $CO_2$, there are a few other things to consider. First, the transient gain coefficient must be scaled, where $$G_t \propto \omega_{anti-Stokes} = \omega_{as} \qquad (3).$$

or $$(G_t)_{CO_2} = (G_t)_{ruby} \text{ if } (I\,t_p)_{CO_2} = (\omega_{as})\text{ruby}/(\omega_{as})\,CO_2\,(I\,t_p)\text{ ruby} \qquad (4).$$

implying that about 4 times as much energy density is required for $CO_2$ as for ruby. However, data available on optical breakdown of gases indicates the need for a very short pulse at the proposed energy densities and gas densities. A pulse of approximately $10^{-11}$ seconds duration generated parametrically and then amplified appears appropriate and feasible.

In the case of $CO_2$ there is the question concerning the possible competition of the direct two quantum processes. The result of the dominance of the direct two quantum processes would imply a gain which is no longer limited by photon number conservation. For $H_2$, the largest gain would be limited to about 5 for the anti-Stokes Raman process.

One possible approach to this question is to initially attempt to optimize the direct two quantum process.

This can be done by attempting to make $\omega_1 = \omega_2$ by finding a Raman active transition very near 1,888 cm$^{-1}$. Among the diatomic gases, such a near resonance does exist for NO at 1,877 cm$^{-1}$, but this example is complicated by the presence of infrared activity and a very rapid and unfavorable V-T relaxational rate.

Figure 4:
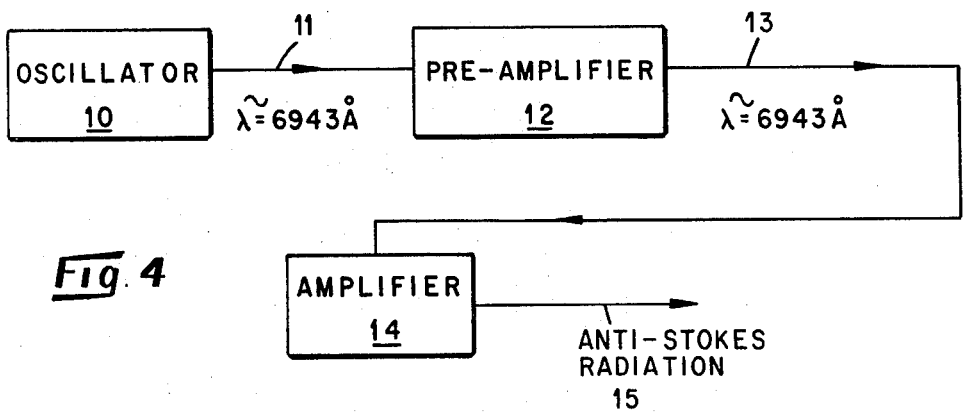
FIG. 4 diagrammatically illustrates an embodiment of the inventive laser system.

A first exemplary embodiment of the inventive laser system, shown in FIG. 4, employs the single Raman anti-Stokes scattering of a mode-locked ruby pulse from molecular hydrogen (para-$H_2$), for example, vibrationally excited by, for example, a transverse electron beam device. As shown, the FIG. 4 embodiment comprises a conventional mode-locked ruby oscillator 10 or other suitable high brightness, short pulse duration source, which produces a pulse 11 ($\lambda \cong 6943$ A) which is directed through one or several conventional ruby pre-amplifier 12 resulting in an amplified pulse 13 ($\lambda \cong 6943$ A) which is directed into the amplifier 14 of the transverse electron beam type containing, for example, molecular hydrogen ($H_2$) as the active lasing medium, which is vibrationally excited by the passing of an intense electromagnetic wave (transverse electron beam) therethrough, producing an anti-Stokes radiation output pulse or beam 15. The electron beam amplifier 14 may, for example, be of the above-referenced type described in the article by C. A. Fenstermacher et al, published in Applied Physics Letters 20, 56 (1972), or in U.S. Pat. No. 3,641,454 issued Feb. 8, 1972 to Barton Krawetz. U.S. Pat. application Ser. No. 250,997, filed May 8, 1972 entitled "Hydrogen Rotation-Vibration Oscillator" by Charles K. Rhodes describes in greater detail vibrationally excited molecular hydrogen. Under the appropriate circumstances, it appears that $e^- - H_2$ collisions will generate an inversion on the $v = 1$ to $v = 0$ transition (fundamental vibration of $H_2$). In the laser system of FIG. 4, the "upshifting" of ruby (14,400 cm$^{-1}$) by multiples of 4,153 cm$^{-1}$ implies an energy gain equivalent to $\sim 1.30$ photons/ruby photon scattered per order. Thus, if 77 percent of the ruby photons can be shifted to the first order anti-Stokes line ($\lambda \sim 5373$ A), as much energy will exist in the output ($\lambda = 6943$ A) beam 15 as is present in the incident ruby beam 11 ($\lambda = 6,943$ A). The same arguments hold for vibrationally excited molecular nitrogen ($N_2$), but 86 percent photon conversion to first order anti-Stokes is required for equal output and input beam energy content.

Experiments have been conducted to verify the invention involving molecular hydrogen excited in a transverse electron beam machine, as illustrated in FIG. 4. Kinetics calculations which follow the individual rotational-vibrational level populations show that for sufficiently high beam current, such as $\sim 50$ amps/cm$^2$, approximately 100 joules/liter can be stored in the inversion of the $O_1(2)$, (i.e., $v = 1, j = 0$ to $v = 0, j = 2$) transition when para-hydrogen at five amagats and 77°K is pumped by electron collisions in a transverse electron beam device. With a vibrational pt of $\sim 300$ $\mu$sec-atmospheres the energy storage properties of vibrating molecular hydrogen are quite favorable. The energy extraction efficiency for stimulated Raman anti-Stokes scattering from this excited molecular hydrogen gas is limited to less than 40 percent.

A preliminary experiment involving Raman anti-Stokes scattering of mode-locked ruby pulses from electric discharge excited molecular nitrogen ($\sim^-$ atmosphere pressure) showed that significant energy appears at the first anti-Stokes frequency even under nonideal conditions. Data on direct electron excitation of vibrational states indicate that the first six vibrational levels should have been excited. Through rotational-vibrational collisional exchange processes, the energy distribution will shift up the vibrational ladder with time as in the CO laser. Therefore, there appears to be a strong spectral dependence on the delay time between the electron discharge initiation and the arrival of the 5–10 psec ruby pulse. For a 10 $\mu$sec delay time and a 0.1 and 0.25 terawatts/cm$^2$ collimated ruby beam traversing a 1 meter N$^2$ device the above conversion was observed. The observed anti-Stokes spectrum is a smooth continuum of ~ 100 A width (<0.3 cm$^{-1}$ resolution), and is not completely understood at this time.

It should be noted that the laser system of the FIG. 4 embodiment is not limited to the use of molecular vibrational levels. The same Raman scattering process will be operative for media in electronically excited states, as for example, the rare gas dimers He$_2$*, Ne$_2$*, Ar$_2$*, Kr$_2$*, and Xe$_2$*, as well as N$_2$. The energy gain extracted from the electronic states can be more than is present in the incident beam 11 from the ruby oscillator 10, thus allowing a gain of as much as a factor of about 2 to 4 in energy simultaneous with a large shift of the optical frequency into the ultraviolet region of the spectrum.

As pointed out above with respect to FIGS. 2 and 3 energy can be stored in a molecular vibration in an inverted media. On account of the relatively heavy nuclear mass, the energy storage capacity of such a system is limited to approximately 4,000 cm$^{-1}$ per molecular radiator. In order to increase the energy stored in an individual quantum mechanical system, transitions which involve a change in electronic coordinators must be considered.

Figure 5:
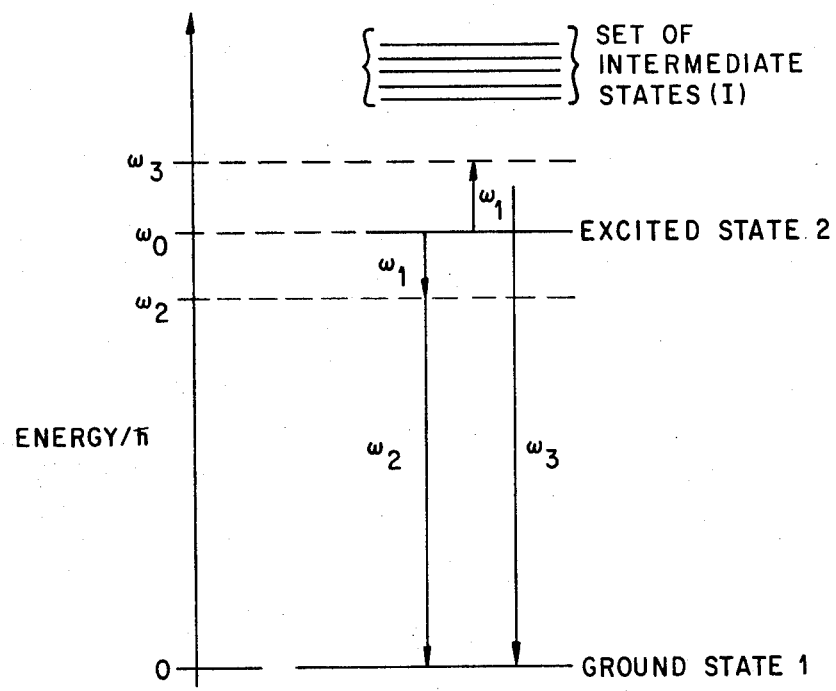
FIG. 5 shows the general energy level scheme illustrating both the Raman anti-Stokes process and the corresponding two quantum process.

In the following, the extension of the Raman anti-Stokes amplifier of FIG. 4 to near-resonant atomic systems is set forth. The radiative metastability of a Raman active system, shown in FIG. 5, greatly improves the energy storage properties by effectively eliminating the radiative decay channel, a consideration which is particularly crucial at ultraviolet frequencies. In FIG. 5, the incident stimulating beam is represented by $\omega_1$ with the assumption that $\omega_0 > \omega_1$ and that a population inversion exists between the excited state 2 and the ground state or level 1. Energy conservation then gives $\omega_2 = \omega_0 - \omega_1$ and $\omega_3 + \omega_0 + \omega_1$ to within the linewidth of the transition. Notice that the degenerate case ($\omega_1 = \omega_2 = \omega_0/2$) involves only two waves, $\omega_1$ and the third harmonic $3\omega_1$.

Recent studies of rare gas mixtures excited in pulsed discharges and by relativistic electron beams provide strong evidence for the possible generation of large inverted atomic metastable populations. The experiments indicate a rapid energy transfer between Ar$_2$* ($^1\Sigma_u^+$) molecules and an impurity of xenon atoms in the nearly resonant process:

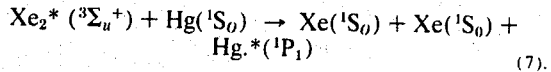

Collisions with argon atoms and slow electrons can then quench the $^1P_1$ population to the lowest atomic excited state, the radiatively metastable $^3P_2$. Under appropriate conditions, it appears that this mechanism can transfer all of the xenon impurity to the $^3P_2$ level. In this case, a relatively modest impurity concentration of $10^{17}$ cm$^{-3}$ corresponds to approximately 200 joules/liter stored.

This inverted system can radiate by near resonant Raman anti-Stokes and direct two quantum emissions. The rate for this process is proportional to $$\frac{1}{g_i} \sum_i \sum_f \left| \sum_I \frac{\langle f|O_1|I\rangle \langle I|O_2|i\rangle}{\Delta\omega_I} \right|^2 \qquad (6)$$

where $O_1$ and $O_2$ are the appropriate transition operators, $|i\rangle$ = initial state = $|2\rangle$, $|f\rangle$ = final state = $|1\rangle$, $|I\rangle$ = intermediate state, $\Delta\omega_I$ = energy denominator in the approximation $\Delta\omega_I >>$ level width, and the summations represent the customary sums over intermediate and final states, as well as the average over initial states. Under conditions where near-resonance occurs ($\Delta\omega_I$ small), the internal state sum in expression (2) is approximated by a single term. Since the $^3P_2 - ^3P_1$ interval in xenon is 977.62 cm$^{-1}$, the CO$_2$ R(22) transition at 977.21 cm$^{-1}$ is an example of this situation. Although the $^3P_2 - ^3P_1$ transition is magnetic dipole, the near-resonance effect enhances the overall Raman cross section. On this basis, it is estimated that for an inversion density of $10^{17}$ cm$^{-3}$, a CO$_2$ $10\mu$ intensity roughly in the range of $10^7$ watts/cm$^2$ to $10^8$ watts/cm$^2$ is sufficient to observe stimulated conversion to the ultraviolet. An appraisal of the photoionization losses is included in this estimate.

It has been further observed that the single photon photoionization loss channel can be eliminated by the choice of a material which has its lowest excited states lower in relation to the ionic level than is the case in the rare gases. An example of this is the $^3P_0$ level of Hg which may be populated efficiently by energy transfer to the $^1P_1$ by the process

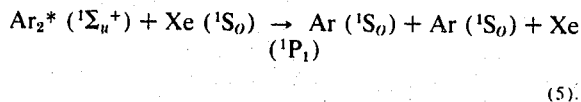

in full analogy with reaction (5).

Other cases for near-resonance in the anti-Stokes Raman process occur for the 106$\mu$YAG which is about 680 cm$^{-1}$ from the $^3P_2 - ^1P_1$ transition in Xe and the CO$_2$ 10.6$\mu$P(18) and P(20) transitions which bracket the $^3P_2 - ^3P_1$ transition in Kr. A fast transfer for energy exchange from Ar$_2$* to Kr has also been found, although experiments suggest that it may not be sufficiently fast to be useful in this context.

In the general nonresonant case a large number of intermediate states contribute in Eq. (6). Competition between the Raman and the direct two quantum process is dependent on the details of the frequency behavior of expression (6). Several major differences exist between the degenerate ($\omega_1 = \omega_2 = \omega_0/2$) two quantum process (DTQP) and the near-resonant anti-Stokes Raman process (RASRP). First, conservation of photon number for the RASRP limits the amplification gain to the ratio of the output to input optical frequencies, while no such constraint exists for the DTQP. The dependence of the growth rate on intensity squared for the DTQP will very probably lead to substantial reductions in the output pulse time duration beyond that of the RASRP. Furthermore, the DTQP generally results in frequencies which are closer to the visible and near ultraviolet spectral regions thereby minimizing the severe materials problems and diagnostic difficulties associated with shorter wavelengths. For DTQP, an intense source for the driving beam must be produced at one half the frequency (within the linewidth) of the optical transition. This may not present a problem, especially if third harmonic generation in alkali metal vapors proves to be very efficient. Finally, phase matching is automatic for DTQP.

The herein described systems have many advantages for the laser/fusion application. It has been predicted that the use of visible or ultraviolet radiation will have a desirable influence on the laser-plasma interaction. Present calculations indicate that a severe decoupling effect may occur in the irradiation of solid targets by light with wavelengths substantially greater than one micron. Furthermore, index nonlinearities should be quite low on account of the substantially reduced medium density and relatively low concentration of excited material. And finally, isolation of the target from the oscillator is easily achieved by the inclusion of dispersive elements between the target and the source as described hereinafter with respect to FIG. 6.

Figure 6:
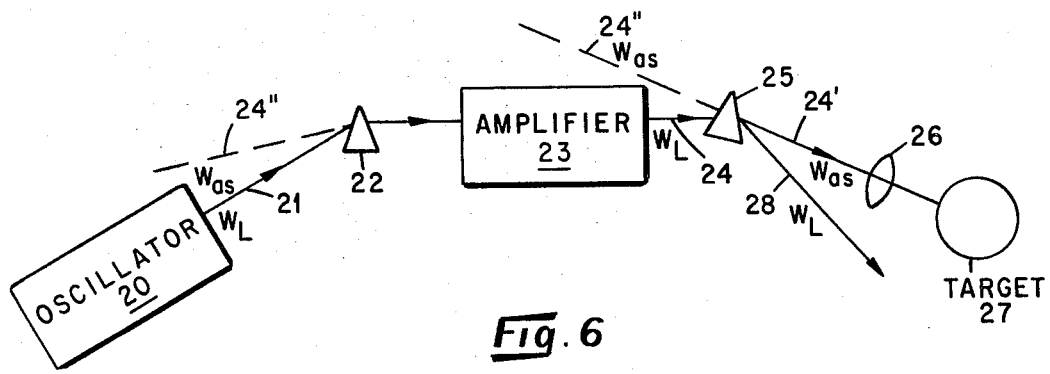
FIG. 6 illustrates a preferred embodiment of the inventive laser system.

The preferred embodiment of the inventive laser system, shown in FIG. 6, implements the concepts of "cascading" the Raman scattering process and optically isolating the laser-produced plasma from the laser source. As shown, the laser system comprises a single pulse mode-locked ruby oscillator 20 producing a pulse $W_L$ indicated at 21 which is directed through a dispersive element 22, such as a prism, into an amplifier 23 containing an active lasing medium of the type described above with respect to FIG. 4 which is activated by an intense electromagnetic wave such as produced in a transverse electron beam machine, as described above, and which amplifies pulse 21 by cascaded, Raman anti-Stokes scattering as described above producing an output pulse or beam $W_{as}$ indicated at 24 of large energy, short wavelength, and narrow pulsewidth which is directed through a second dispersive element 25, through a lens or collimator 26 to a target 27, such as for fusion plasma heating. As pulse 24 passed through the dispersive element 25 it is, as known in the optical art, divided into two beams, one being the anti-Stokes radiation $W_{as}$ indicated at 24' and the other being a reflective beam $W_L$ indicated at 28, Also, a portion of the anti-Stokes radiation beam 24 is reflected back through dispersive element 22 as indicated at 24'' but is directed away from the oscillator 20.

In the "cascading" mode of operation, illustrated in FIG. 6, the $n$-th anti-Stokes radiation (at frequency $\omega + n\omega_0$) serves as the exciting line for conversion to the $(n + 1)$-th anti-Stokes (at frequency $\omega + (n + 1)\omega_0$). The isolation of the laser source is implemented by the use of dispersive elements 22 and 25 placed at input and output of the "Raman converters" or amplifier 23.

It has thus been shown that the inventive laser system, which utilizes the Raman anti-Stokes scattering process, produces pulsed outputs of large energy, short wavelength (ultraviolet), and narrow pulsewidth. Thus, the requirements related to energy storage properties, the radiated wavelengths, the elimination of the need for optical isolation, and scaling considerations are all simultaneously satisfied by the inventive laser system.

While particular embodiments of the invention have been illustrated and described, modifications and changes will become apparent to those skilled in the art, and it is intended to cover in the appended claims all such modifications and changes as come within the spirit and scope of the invention.

What we claim is:

1. A laser system for producing high energy pulsed outputs of narrow pulsewidth and short wavelength comprising: a single pulse mode-locked oscillator means for producing a narrow pulse of light energy, an electron beam activated amplifier means positioned to receive said narrow pulse and containing an active lasing medium capable of producing anti-Stokes radiation by a Raman anti-Stokes scattering process when said lasing medium is illuminated by a transverse electron beam directed through said active lasing medium constituting an intense electromagnetic wave for amplifying said narrow pulse and producing pulsed outputs of narrow pulsewidth and short wavelength, means for optically isolating said oscillator means from reflected portions of said pulsed outputs from said amplifier means, said isolating means comprising dispersive means positioned at input and output sides of said amplifier means, and collimator means positioned to receive non-reflected portions of said pulsed outputs passing through said dispersive means positioned on the output side of said amplifier means and directing same to a point of use.

2. The laser system defined in claim 1, wherein said active lasing medium is selected from molecular hydrogen, molecular nitrogen, and rare gas dimers.

3. The laser system defined in claim 2, wherein said rare gas dimers are selected from the group consisting of $He_2^*$, $Ne_2^*$, $Ar_2^*$, $Kr_2^*$, and $Xe_2^*$.

* * * * *